(12) United States Patent
Kruglick

(10) Patent No.: US 8,385,389 B2
(45) Date of Patent: Feb. 26, 2013

(54) COLLABORATIVE DATA SHARING FOR CDMA INTERFERENCE SUBTRACTION

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 28 days.

(21) Appl. No.: 13/057,082

(22) PCT Filed: Nov. 3, 2010

(86) PCT No.: PCT/US2010/055264
§ 371 (c)(1),
(2), (4) Date: Feb. 1, 2011

(87) PCT Pub. No.: WO2012/060826
PCT Pub. Date: May 10, 2012

(65) Prior Publication Data
US 2012/0106597 A1    May 3, 2012

(51) Int. Cl.
*H04B 1/00* (2006.01)
(52) U.S. Cl. ............ 375/148; 375/140; 375/147
(58) Field of Classification Search ............ 375/148
See application file for complete search history.

(56) References Cited

U.S. PATENT DOCUMENTS

| | | | |
|---|---|---|---|
| 5,105,435 A | | 4/1992 | Stilwell |
| 5,157,408 A | * | 10/1992 | Wagner et al. ............ 342/399 |
| 5,258,995 A | | 11/1993 | Su et al. |
| 5,568,509 A | | 10/1996 | Hershey et al. |
| 5,761,196 A | | 6/1998 | Ayerst et al. |
| 5,912,644 A | * | 6/1999 | Wang .......................... 342/457 |
| 6,067,442 A | * | 5/2000 | Wiedeman et al. .......... 455/13.1 |
| 6,188,714 B1 | * | 2/2001 | Yamaguchi .................. 375/130 |
| 6,208,745 B1 | * | 3/2001 | Florencio et al. ............ 382/100 |
| 6,269,113 B1 | * | 7/2001 | Park ............................. 375/146 |
| 6,404,802 B1 | * | 6/2002 | Kang et al. .................... 375/146 |
| 6,745,050 B1 | | 6/2004 | Forsythe et al. |
| 7,701,996 B1 | * | 4/2010 | Giallorenzi et al. .......... 375/130 |
| 2003/0095531 A1 | * | 5/2003 | Soerensen et al. ............ 370/342 |
| 2003/0156603 A1 | * | 8/2003 | Rakib et al. .................. 370/485 |
| 2004/0071198 A1 | * | 4/2004 | Lomp et al. .................. 375/148 |
| 2004/0081077 A1 | * | 4/2004 | Mennekens et al. .......... 370/208 |
| 2004/0114550 A1 | * | 6/2004 | Wei et al. ..................... 370/320 |
| 2004/0179500 A1 | * | 9/2004 | Ozluturk ...................... 370/335 |
| 2005/0243897 A1 | * | 11/2005 | Lomp et al. .................. 375/146 |
| 2009/0003418 A1 | * | 1/2009 | Karabinis ..................... 375/219 |
| 2010/0054225 A1 | * | 3/2010 | Hadef et al. .................. 370/342 |
| 2012/0027138 A1 | * | 2/2012 | Nagarajan et al. ............ 375/346 |
| 2012/0135725 A1 | * | 5/2012 | Pinder et al. ............... 455/422.1 |

OTHER PUBLICATIONS

"1X Advanced—Four-Fold Increase in Voice Capacity," Qualcomm Incorporated May 2009, accessed at http://www.docstoc.com/docs/12656761/CDMA-1X-Advanced-%E2%80%93-Four-Fold-Increase-in-Voice-Capacity, pp. 12.
"4Q 2009 CDMA Subscribers," CDMA Development Group, 2009, accessed at http://www.cdg.org/worldwide/report/094Q_cdma_subscriber_report.pdf, pp. 1-16.
"CDMA End-to-End Security," accessed at http://web.archive.org/web/20081206011319/http://www.nortel.com/solutions/wireless/collateral/nn_107760.09-15-04.pdf, pp. 1-8, 2005.
"Maximum likelihood," accessed at http://en.wikipedia.org/wiki/Maximum_likelihood, last modified on Jun. 8, 2012, pp. 14.

(Continued)

Primary Examiner — Erin File

(57) ABSTRACT

Implementations and techniques for collaborative data sharing for CDMA interference subtraction are generally disclosed.

29 Claims, 4 Drawing Sheets

OTHER PUBLICATIONS

Madkour, M. F. et al., "Successive interference cancellation algorithms for downlink W-CDMA communications," vol. 1, Issue 1, IEEE Transactions on Wireless Communications, pp. 169-177 (2002).

Perry T.S., "Andrew viterbi's Fabulous Formula", vol. 47, Issue 5, IEEE Spectrum Magazine, pp. 47-50 (2010).

International Search Report and Written Opinion for International Patent Application No. PCT/US2010/055264 mailed on Dec. 16, 2010.

Sud, Shivani et al., Enabling Rapid Wireless System Composition through Layer-2 Discovery, IEEE Network, Jul./Aug. 2008.

\* cited by examiner

400 A computer program product.

402 A signal bearing medium.

404 at least one of one or more instructions for receiving a pseudorandom code seed value at a first wireless communications device, wherein the pseudorandom code seed value is associated with a second wireless communications device;

one or more instructions for receiving a wireless spread spectrum signal at the first wireless communications device over a direct-sequence spread spectrum (DSSS) channel;

one or more instructions for performing signal subtraction at the first wireless communications device based at least in part on the pseudorandom code seed value and the wireless spread spectrum signal;

one or more instructions for using the pseudorandom code seed value to estimate a wireless spread spectrum communication transmitted by the second wireless communications device and received at the first wireless communications device as a portion of the wireless spread spectrum signal;

one or more instructions for receiving a second pseudorandom code seed value at the first wireless communications device, wherein the second pseudorandom code seed value is associated with a third wireless communications device, and wherein performing signal subtraction at the first wireless communications device comprises performing signal subtraction at the first wireless communications device based at least in part on the wireless spread spectrum signal, the pseudorandom code seed value, and the second pseudorandom code seed value; or one or more instructions for generating a maximum-likelihood estimation for a wireless spread spectrum communication received from the second wireless communications device as a portion of the wireless spread spectrum signal.

| 406 a computer-readable medium. | 408 a recordable medium. | 410 a communications medium. |

FIG. 4

COLLABORATIVE DATA SHARING FOR CDMA INTERFERENCE SUBTRACTION

BACKGROUND

Unless otherwise indicated herein, the approaches described in this section are not prior art to the claims in this application and are not admitted to be prior art by inclusion in this section.

Code Division Multiple Access (CDMA) is a spread-spectrum communications scheme used in many cellular handsets. In CDMA all transmitters utilize the same communication channel simultaneously and spread information across the spectrum of the channel using individual unique signatures. With each transmitter sending its information in different portions of the spectrum, a channel may appear to contain only noise but a receiver may discern information if it knows where to look for a signal within the channel.

CDMA was initially developed for use by standalone receivers that do not have knowledge of the characteristics of neighboring devices. However, with the proliferation of CDMA devices the impacts of neighboring transmissions have become non-trivial. As a result, receivers often dedicate significant processing power to extracting a particular transmitter's data from the "noise" associated with the transmissions of other devices. Typically, this processing power is achieved using custom hardware processors in base stations where power and processing capacity are plentiful.

SUMMARY

In accordance with some implementations, methods for facilitating wireless spread spectrum communications may generally include receiving, at a first wireless communications device and a pseudorandom code seed value. The pseudorandom code seed value may be associated with a second wireless communications device. A wireless spread spectrum signal may also be received at the first wireless communications device over a direct-sequence spread spectrum (DSSS) channel. Signal subtraction may be performed at the first wireless communications device based at least in part on the pseudorandom code seed value and the wireless spread spectrum signal.

In accordance with some implementations, articles including a computer program product are also generally described where the products store instructions that, if executed, may result in receiving, at a first wireless communications device, a pseudorandom code seed value. The pseudorandom code seed value may be associated with a second wireless communications device. The instructions may also result in a wireless spread spectrum signal being received at the first wireless communications device over a direct-sequence spread spectrum (DSSS) channel. The instructions may further result in signal subtraction being performed at the first wireless communications device based at least in part on the pseudorandom code seed value and the wireless spread spectrum signal.

In accordance with some implementations, systems are generally described that may include one or more modules configured to receive a pseudorandom code seed value, where the pseudorandom code seed value is associated with a second wireless communications device. The one or more modules may also be configured to receive a wireless spread spectrum signal over a direct-sequence spread spectrum (DSSS) channel, and to perform signal subtraction based at least in part on the pseudorandom code seed value and the wireless spread spectrum signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The subject matter of the present disclosure is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 4 is an illustration of an example computer program product; and

DETAILED DESCRIPTION

Figure 1:
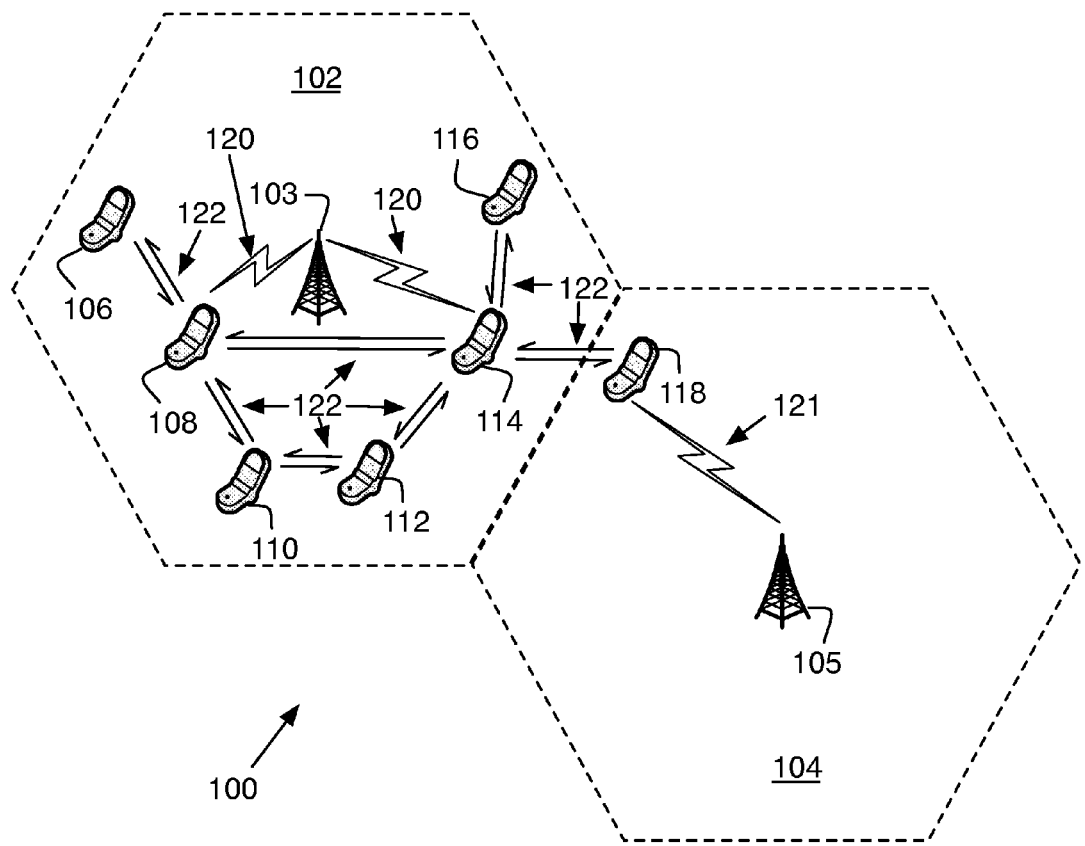
FIG. 1 is an illustrative diagram of an example system.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the embodiments of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems generally related to spread-spectrum communications and more particularly related to CDMA interference subtraction.

In accordance with various implementations of the present disclosure, CDMA devices such as cellular telephones may share correlative data such as CDMA spreading code seeds over another communication channel. In various examples the other channel may be another CDMA channel, a channel conforming with the Institute of Electrical and Electronics Engineers (IEEE) 802.11 standard such as a WiFi™ (hereinafter "WiFi") channel, a frequency-hopping spread spectrum (FHSS) channel such as a Bluetooth™ (hereinafter "Bluetooth") channel, etc.

In accordance with various implementations of the present disclosure, an on-board processor in a CDMA device may utilize the code seed(s) received from one or more neighboring devices to generate the neighboring device's spreading codes and then use signal subtraction techniques to remove the noise contribution of those neighbors from a CDMA channel signal. Further, in various implementations, neighboring devices may also share spreading code seeds received from other neighboring CDMA devices and/or from a base station to allow a CDMA device to subtract out the non-signal from other neighboring devices and/or base stations.

In accordance with various implementations of the present disclosure, a CDMA device may employ correlative data such as pseudo-random code seeds received from one or more neighboring devices to generate a maximum-likelihood estimation of CDMA signals transmitted by those neighboring devices and then subtract the estimated signals from received CDMA signals. In various examples the correlative data may be highly compressed using, for example, code alignment marking techniques to identify the codes being used and, optionally, spectral data on either a live or look ahead basis.

In accordance with various implementations of the present disclosure, CDMA devices employing the techniques described herein may be mobile or fixed in location. For example a set of fixed devices (such as components of a home network) employing CDMA communications techniques may exchange correlative data over the Internet to help each other resolve some of the transmitted signals they are receiving in order to subtract them out. Correlative data such as spreading code information may be shared through any mechanism. For example, an internet registration may be used to facilitate correlative data sharing.

FIG. 1 illustrates portions of an example wireless network 100 in accordance with at least some embodiments of the present disclosure. Network 100 includes adjacent wireless cells 102 and 104 having respective base stations 103 and 105. Network 100 may be any network implementing any type of CDMA communication technique such as, for example, Wideband CDMA (W-CDMA). While FIG. 1 illustrates portions of a wireless network 100, in various examples collaborative data sharing for CDMA interference subtraction may be undertaken in accordance with various implementations of the present disclosure for any networks, wireless or otherwise, implementing CDMA communication techniques.

Cell 102 includes user devices 106, 108, 110, 112, 114 and 116 all capable of undertaking spread spectrum communications within network 100. Cell 104 includes a user device 118 also capable of undertaking spread spectrum communications within network 100. In various examples, devices 106, 108, 110, 112, 114, 116 and 118 may be cellular telephones. In the example of FIG. 1, devices 106, 108, 110, 112, 114 and 116 communicate with base station 103 of cell 102 over CDMA channel 120, while device 118 communicates with base station 105 of cell 104 using another CDMA channel 121. In addition, user devices 106, 108, 110, 112, 114, 116 and 118 may communicate with one another using other communication channels 122. In various implementations, channels 122 may be CDMA channels, WiFi channels, Bluetooth channels, or any other type of communication channel.

In various implementations, user devices 106, 108, 110, 112, 114, 116 and 118 may share correlative data such as spreading code seeds over channels 122. In various implementations, user devices 106, 108, 110, 112, 114, 116 and 118 may share additional correlative data over channels 122. For example, in various implementations, devices 106, 108, 110, 112, 114, 116 and 118 may share additional correlative data such as time index values associated with spreading code seeds. As will be explained in greater detail below, one or more of user devices 106, 108, 110, 112, 114, 116 and 118 may then use the correlative data associated with the other user devices to at least partially filter out or compensate for interference in signals received over CDMA channel 120.

Figure 2:
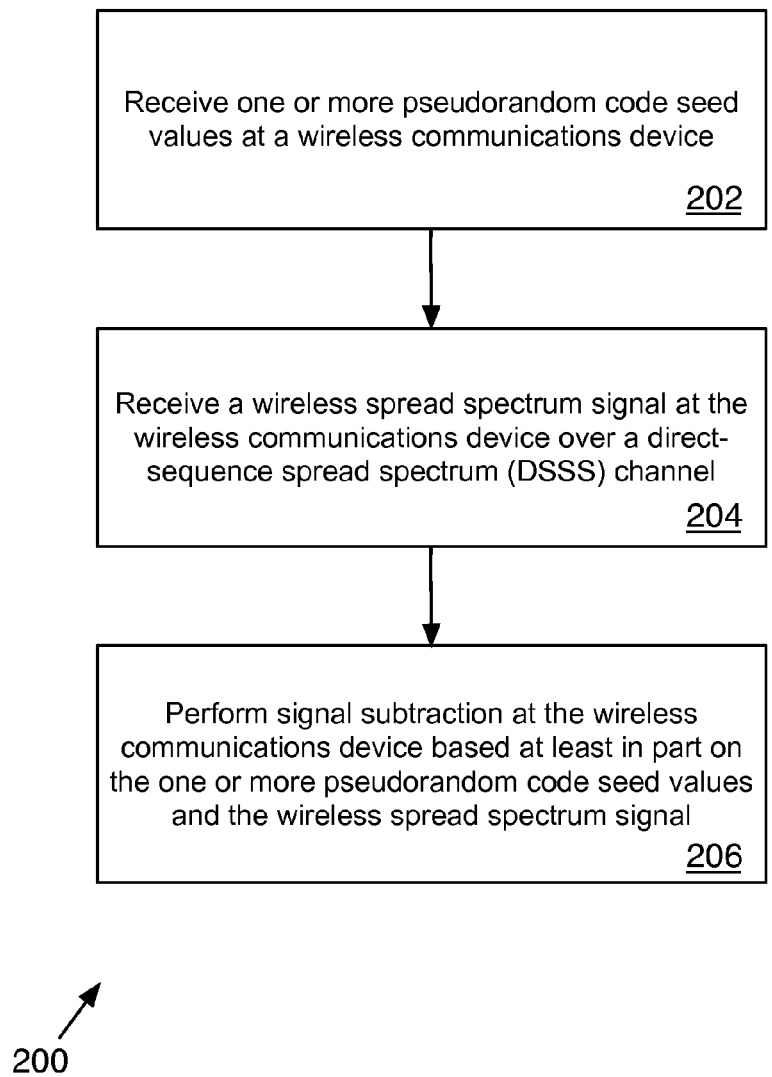
FIG. 2 is an illustration of an example process for collaborative data sharing for CDMA interference subtraction.

FIG. 2 illustrates a flow diagram of an example process 200 for collaborative data sharing for CDMA interference subtraction according to various implementations of the present disclosure. Process 200 may include one or more operations, functions or actions as illustrated by one or more of blocks 202, 204 and/or 206. Process 200 may begin at block 202.

Figure 3:
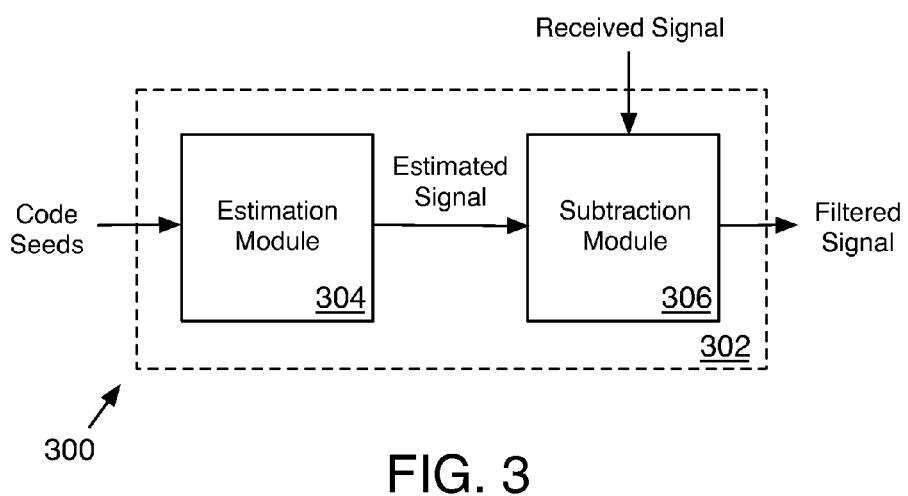
FIG. 3 is an illustrative diagram of a portion of the example system of FIG. 1.

At block 202, one or more pseudorandom code seed values may be received. For example, FIG. 3 illustrates a portion 300 of example user device 108 of the system of FIG. 1 that may undertake at least portions of process 200 including receiving one or more pseudorandom code seed values in block 202. In various examples, portion 300 may include at least a signal filter module 302 having an estimation module 304 and a subtraction module 306. In various examples, modules 302, 304 and 306 may be implemented in software, firmware, hardware and/or any combination thereof. For example, in various implementations, a processor of device 108 may implement module 302 and modules 304 and/or 306 may be implemented by instructions executing on that processor in response to one or more software and/or firmware algorithms.

In various implementations the one or more pseudorandom code seed values of block 202 may be received over a communications channel implementing a spread spectrum communications technique such as CDMA or a communications technique other than a spread spectrum communications technique. For example, device 108 may receive one or more pseudorandom code seed values from one or more of neighboring user devices 106, 110 and 114 over channels 122 where channels 122 may be cellular CDMA channels, non-cellular direct-sequence spread spectrum (DSSS) channels and/or frequency-hopping spread spectrum (FHSS) channels, etc. In some examples, channels 122 may be WiFi and/or Bluetooth channels.

In various implementations, the one or more pseudorandom code seed values of block 202 may be received as at least part of a broadcast communication. For example, device 114 may provide the values to device 108 in the form of a WiFi beacon update broadcast where data specifying the pseudorandom code seed values may be encapsulated in one or more Application-Specific Information Elements (ASIEs) within one or more beacon frames. Moreover, additional correlative data such as one or more time indices associated with one or more pseudorandom code seed values may be provided in one or more beacon frames.

Further, in various implementations, the one or more pseudorandom code seed values of block 202 may be associated with one or more neighboring wireless communication devices. For example, device 108 may receive pseudorandom code seed values associated with one or more of neighboring user devices 106, 110 and 114.

In addition, in various implementations, the one or more pseudorandom code seed values received in block 202 may be associated with one or more neighboring wireless communication devices that are not in direct communication with the receiving device. For example, in various implementations, device 108 may receive pseudorandom code seed values directly from neighboring device 114 where those values are associated with wireless communications devices that are not directly communicatively coupled with device 108 over one of channels 122. For example, device 114 may have received pseudorandom code seed values associated with one or more of devices 112, 116 and/or 118 prior to providing those values to device 108 over one of channels 122 at block 202. Process 200 may continue with block 204. Moreover, additional correlative data such as one or more time indices associated with one or more pseudorandom code seed values may be provided over channels 122 where the additional correlative data may be associated with neighboring devices whether or not those devices are directly communicatively coupled with the receiving device over channels 122.

At block 204 a wireless spread spectrum signal may be received at the wireless communications device over a DSSS channel. In various implementations the DSSS channel may be a cellular DSSS channel such as a CDMA channel. For example, referring again to FIGS. 1 and 3, block 204 may include device 108 receiving a wireless spread spectrum signal over CDMA channel 120 where the signal may be received at module 302 by subtraction module 306. In some examples, the signal received by module 306 may be a digitized and/or otherwise processed version of the signal received by device 108 over CDMA channel 120. Process 200 may continue with block 206.

At block 206 signal subtraction may be undertaken at the wireless communications device based at least in part on the one or more pseudorandom code seed values and the wireless spread spectrum signal. Referring again to FIGS. 1 and 3, in various implementations block 206 may involve a wireless communications device, such as device 108, generating one or more estimated wireless spread spectrum communications using the one or more pseudorandom code seed values received in block 202. For example, device 108 may use estimation module 304 to generate or reconstruct a spreading code employed by device 114 in generating spread spectrum communications that device 114 transmits over CDMA channel 120. Module 304 may then use the reconstructed spreading code associated with device 114 to generate an estimated signal corresponding to spread spectrum communications transmitted by device 114. For instance, in various examples, block 206 may involve using a code seed received at block 202 and the signal received at block 204 to determine a time index associated with the received signal. The reconstructed spreading code and associated time index may then be used, at least in part, to generate an estimated signal at block 206. In some implementations, generation of an estimated signal during block 206 may include generating an estimated signal spectrum.

In addition to the generation of an estimated signal associated with communications transmitted by device 114, block 206 may further include subtraction module 306 subtracting the estimated signal from the received signal to generate a filtered signal that at least partially excludes contributions from spread spectrum communications transmitted by device 114. In a similar manner, block 206 may involve a device, such as device 108, generating estimated signals associated with all neighboring devices for which code seed values received in block 202. In some examples, block 206 may also involve, at least in part, generating a maximum-likelihood estimation of one or more CDMA signals associated with neighboring devices.

As may be recognized, a wireless spread spectrum signal received over a DSSS channel at block 204 may include not only specific spread spectrum communications transmitted to the wireless communications device by, for example, a base station, but may also include a noise contribution associated with interference from other wireless communications devices using the same or other DSSS channels. For example, a spread spectrum signal received by device 108 over CDMA channel 120 may include a noise contribution associated with spread spectrum communications transmitted by one or more of neighboring devices 106, 110, 112, 114, and/or 116 over the same CDMA channel 120. Further, a spread spectrum signal received by device 108 over CDMA channel 120 may include a noise contribution associated with spread spectrum communications transmitted by one or more of neighboring devices on different CDMA channels. For example, device 118 communicating over CDMA channel 121 of cell 104. By undertaking block 206, contributions associated with spread spectrum signals transmitted by one or more of neighboring devices 106, 110, 112, 114, 116 and/or 118 may be at least partially filtered out from the spread spectrum signal received at block 204.

While the implementation of example process 200 may include a single undertaking of blocks 202, 204 and 206, claimed subject matter is not limited in this regard and, in various implementations, implementation of process 200 may include the undertaking of one or more of blocks 202, 204 and/or 206 multiple times. For example, in various implementations, block 202 may be undertaken multiple times as code seed values are received from multiple neighboring devices. Further, in some examples, block 206 may be undertaken separately for each instance of code seed values received in block 202, whereas, in other examples, block 206 may be undertaken once regardless of the number of instantiations of blocks 202 and/or 204.

In addition, while example implementations have been discussed above in the context of mobile wireless communications systems, in accordance with various implementations, CDMA devices employing the techniques described herein may be mobile or may be fixed in location. For example a set of fixed devices (such as components of a home network) employing a CDMA communications technique may undertake various blocks of process 200. Further, correlative data such as spreading code seed values may be shared through any mechanism. For instance, while example implementations have been discussed above in the context of receiving code seed values over wireless communication channels, in accordance with various implementations, an internet registration, for example, may be used to facilitate the receiving of code seed values in block 202.

FIG. 4 illustrates an example computer program product 400 arranged in accordance with at least some examples of the present disclosure. Program product 400 may include a signal bearing medium 402. Signal bearing medium 402 may include one or more instructions 404 that, when executed by, for example, a processor, may provide the functionality described above with respect to FIG. 2. Thus, for example, referring to the system of FIG. 3, one or more of modules 302, 304 and/or 306 may undertake one or more of the blocks shown in FIG. 2 in response to instructions 404 conveyed by medium 402.

In some implementations, signal bearing medium 402 may encompass a computer-readable medium 406, such as, but not limited to, a hard disk drive, a Compact Disc (CD), a Digital Versatile Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, referring to the system of FIG. 1, program product 400 may be wirelessly conveyed to device 108 by signal bearing medium 402, where signal bearing medium 402 is conveyed to device 108 by a wireless communications medium 410 (e.g., an wireless communications medium conforming with the 802.11 standard).

Figure 5:
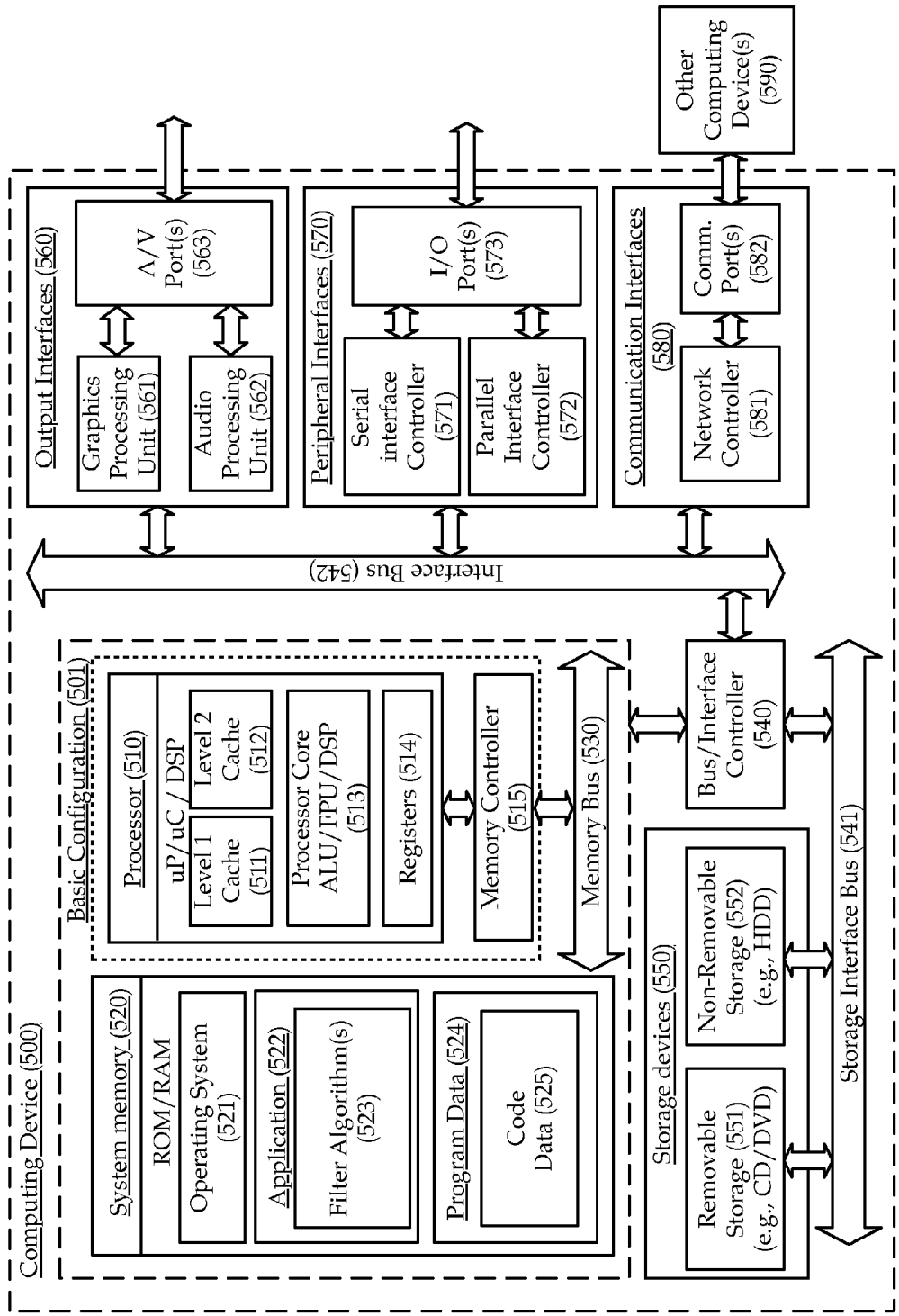
FIG. 5 is an illustration of an example computing device, all arranged in accordance with at least some embodiments of the present disclosure.

FIG. 5 is a block diagram illustrating an example computing device 500. In some examples, computing device 500 may undertake collaborative data sharing for CDMA interference subtraction. In a very basic configuration 501, computing device 500 typically includes one or more processors 510 and system memory 520. A memory bus 530 can be used for communicating between the processor 510 and the system memory 520.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 may include instructions 523 that are arranged to perform the functions as described herein including the actions described with respect to the flow chart shown in FIG. 2. Program Data 524 may include code data 525, such as pseudorandom code seed values that may be useful for implementing instructions 523. In some examples, application 522 can be arranged to operate with program data 524 on an operating system 521 such that implementations of collaborative data sharing for CDMA interference subtraction, as described herein, may be provided. This described basic configuration is illustrated in FIG. 5 by those components within dashed line 501.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 542 for facilitating communication from various interface devices (e.g., output interfaces, peripheral interfaces, and communication interfaces) to the basic configuration 501 via the bus/interface controller 540. Example output interfaces 560 include a graphics processing unit 561 and an audio processing unit 562, which can be configured to communicate to various external devices such as a display or speakers via one or more A/V ports 563. Example peripheral interfaces 560 include a serial interface controller 571 or a parallel interface controller 572, which can be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which can be arranged to facilitate communications with one or more other computing devices 590 over a network communication via one or more communication ports 582. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations or implemented in a workstation or a server configuration.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include an global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method for facilitating wireless spread spectrum communications, the method comprising:
   receiving a pseudorandom code seed value at a first wireless communications device, wherein the pseudorandom code seed value is associated with a second wireless communications device;
   receiving a second pseudorandom code seed value at the first wireless communications device, wherein the second pseudorandom code seed value is associated with a third wireless communications device;
   receiving a wireless spread spectrum signal at the first wireless communications device over a direct-sequence spread spectrum (DSSS) channel; and
   performing signal subtraction at the first wireless communications device based at least in part on the wireless spread spectrum signal, the pseudorandom code seed value, and the second pseudorandom code seed value.

2. The method of claim 1, wherein the pseudorandom code seed value is received at the first wireless communications device over a communications channel other than the DSSS channel.

3. The method of claim 2, wherein the DSSS channel comprises a cellular DSSS channel, and wherein the communications channel other than the DSSS channel comprises another cellular DSSS channel, a frequency-hopping spread spectrum (FHSS) channel or a non-cellular DSSS channel.

4. The method of claim 1, wherein performing signal subtraction at the first wireless communications device comprises using the pseudorandom code seed value to estimate a wireless spread spectrum communication transmitted by the second wireless communications device and received at the first wireless communications device as a portion of the wireless spread spectrum signal.

5. The method of claim 4, wherein using the pseudorandom code seed value to estimate the wireless spread spectrum communication transmitted by the second wireless communications device comprises using the pseudorandom code seed value to generate a spreading code associated with the second wireless communications device.

6. The method of claim 1, further comprising:
   receiving a time index value associated with the second wireless communications device, and wherein performing signal subtraction at the first wireless communications device comprises performing signal subtraction at the first wireless communications device based at least in part on the pseudorandom code seed value, the time index value and the wireless spread spectrum signal.

7. The method of claim 1 wherein performing signal subtraction at the first wireless communications device comprises generating a maximum-likelihood estimation for a wireless spread spectrum communication received from the second wireless communications device as a portion of the wireless spread spectrum signal.

8. The method of claim 1 wherein receiving the pseudorandom code seed value at the first wireless communications device comprises receiving a beacon update at the first wireless communications device, wherein the beacon update includes the pseudorandom code seed value.

9. An article comprising a non-transitory computer program product having stored therein instructions that, if executed, result in:
   receiving a pseudorandom code seed value at a first wireless communications device, wherein the pseudorandom code seed value is associated with a second wireless communications device;
   receiving a second pseudorandom code seed value at the first wireless communications device, wherein the second pseudorandom code seed value is associated with a third wireless communications device;
   receiving a wireless spread spectrum signal at the first wireless communications device over a direct-sequence spread spectrum (DSSS) channel; and
   performing signal subtraction at the first wireless communications device based at least in part on the wireless spread spectrum signal, the pseudorandom code seed value, and the second pseudorandom code seed value.

10. The article of claim 9, wherein the pseudorandom code seed value is received at the first wireless communications device over a communications channel other than the DSSS channel.

11. The article of claim 10, wherein the DSSS channel comprises a cellular DSSS channel, and wherein the communications channel other than the DSSS channel comprises another cellular DSSS channel, a frequency-hopping spread spectrum (FHSS) channel or a non-cellular DSSS channel.

12. The article of claim 9, wherein performing signal subtraction at the first wireless communications device comprises using the pseudorandom code seed value to estimate a wireless spread spectrum communication transmitted by the second wireless communications device and received at the first wireless communications device as a portion of the wireless spread spectrum signal.

13. The article of claim 12, wherein using the pseudorandom code seed value to estimate the wireless spread spectrum communication transmitted by the second wireless communications device comprises using the pseudorandom code seed value to generate a spreading code associated with the second wireless communications device.

14. The article of claim 12, further having stored therein instructions that, if executed, result in:
receiving a time index value associated with the second wireless communications device, and wherein performing signal subtraction at the first wireless communications device comprises performing signal subtraction at the first wireless communications device based at least in part on the pseudorandom code seed value, the time index value and the wireless spread spectrum signal.

15. A system comprising:
one or more modules of a first wireless communications device, the one or more modules configured to:
receive a pseudorandom code seed value, wherein the pseudorandom code seed value is associated with a second wireless communications device;
receive a second pseudorandom code seed value, wherein the second pseudorandom code seed value is associated with a third wireless communications device;
receive a wireless spread spectrum signal over a direct-sequence spread spectrum (DSSS) channel; and
perform signal subtraction based at least in part on the wireless spread spectrum signal, the pseudorandom code seed value, and the second pseudorandom code seed value.

16. The system of claim 15, wherein the pseudorandom code seed value is received over a communications channel other than the DSSS channel.

17. The system of claim 15, wherein performing signal subtraction comprises using the pseudorandom code seed value to estimate a wireless spread spectrum communication transmitted by the second wireless communications device and received at the first wireless communications device as a portion of the wireless spread spectrum signal.

18. A method for facilitating wireless spread spectrum communications, the method comprising:
receiving a pseudorandom code seed value at a first wireless communications device, wherein the pseudorandom code seed value is associated with a second wireless communications device;
receiving a wireless spread spectrum signal at the first wireless communications device over a direct-sequence spread spectrum (DSSS) channel; and
performing signal subtraction at the first wireless communications device based at least in part on the pseudorandom code seed value and the wireless spread spectrum signal by:
generating a spreading code associated with the second wireless communications device based at least in part on the received pseudorandom code seed value;
generating an estimated wireless spread spectrum signal associated with the second wireless communications device based at least in part on the spreading code; and
subtracting the estimated wireless spread spectrum signal from received wireless spread spectrum signal to generate a filtered wireless spread spectrum signal.

19. The method of claim 18, wherein the pseudorandom code seed value is received at the first wireless communications device over a communications channel other than the DSSS channel.

20. The method of claim 18, further comprising:
receiving a time index value associated with the second wireless communications device, and wherein performing signal subtraction at the first wireless communications device comprises performing signal subtraction at the first wireless communications device based at least in part on the time index value.

21. The method of claim 18, wherein receiving the pseudorandom code seed value at the first wireless communications device comprises receiving a beacon update at the first wireless communications device, wherein the beacon update includes the pseudorandom code seed value.

22. An article comprising a non-transitory computer program product having stored therein instructions that, if executed, result in:
receiving a pseudorandom code seed value at a first wireless communications device, wherein the pseudorandom code seed value is associated with a second wireless communications device;
receiving a wireless spread spectrum signal at the first wireless communications device over a direct-sequence spread spectrum (DSSS) channel; and
performing signal subtraction at the first wireless communications device based at least in part on the pseudorandom code seed value and the wireless spread spectrum signal by:
generating a spreading code associated with the second wireless communications device based at least in part on the received pseudorandom code seed value;
generating an estimated wireless spread spectrum signal associated with the second wireless communications device based at least in part on the spreading code; and
subtracting the estimated wireless spread spectrum signal from received wireless spread spectrum signal to generate a filtered wireless spread spectrum signal.

23. The article of claim 22, wherein the pseudorandom code seed value is received at the first wireless communications device over a communications channel other than the DSSS channel.

24. The article of claim 22, further having stored therein instructions that, if executed, result in:
receiving a time index value associated with the second wireless communications device, and wherein performing signal subtraction at the first wireless communications device comprises performing signal subtraction at the first wireless communications device based at least in part on the time index value.

25. The article of claim 22, wherein receiving the pseudorandom code seed value at the first wireless communications device comprises receiving a beacon update at the first wireless communications device, wherein the beacon update includes the pseudorandom code seed value.

26. A system comprising:
one or more modules of a first wireless communications device, the one or more modules configured to:

receive a pseudorandom code seed value, wherein the pseudorandom code seed value is associated with a second wireless communications device;
receive a wireless spread spectrum signal over a direct-sequence spread spectrum (DSSS) channel;
perform signal subtraction based at least in part on the pseudorandom code seed value and the wireless spread spectrum signal by:
   generating a spreading code associated with the second wireless communications device based at least in part on the received pseudorandom code seed value;
   generating an estimated wireless spread spectrum signal associated with the second wireless communications device based at least in part on the spreading code; and
   subtracting the estimated wireless spread spectrum signal from received wireless spread spectrum signal to generate a filtered wireless spread spectrum signal.

27. The system of claim 26, wherein the pseudorandom code seed value is received at the first wireless communications device over a communications channel other than the DSSS channel.

28. The system of claim 26, wherein the one or more modules are further configured to:
   receive a time index value associated with the second wireless communications device, and wherein performing signal subtraction at the first wireless communications device comprises performing signal subtraction at the first wireless communications device based at least in part on the time index value.

29. The system of claim 26, wherein receiving the pseudorandom code seed value at the first wireless communications device comprises receiving a beacon update at the first wireless communications device, wherein the beacon update includes the pseudorandom code seed value.

* * * * *

UNITED STATES PATENT AND TRADEMARK OFFICE
CERTIFICATE OF CORRECTION

PATENT NO. : 8,385,389 B2  Page 1 of 1
APPLICATION NO. : 13/057082
DATED : February 26, 2013
INVENTOR(S) : Kruglick It is certified that error appears in the above-identified patent and that said Letters Patent is hereby corrected as shown below:

In the Drawings:

In Fig. 5, Sheet 4 of 4, delete "uP / uC / DSP" and insert -- $\mu P / \mu C / DSP$ --, therefor.

In the Specification:

In Column 7, Line 5, delete "(e.g., an" and insert -- (e.g., a --, therefor.

In Column 7, Line 45, delete "(HDD)," and insert -- (HDDs), --, therefor.

In Column 7, Line 47, delete "(SSD)," and insert -- (SSDs), --, therefor.

In Column 7, Line 57, delete "(DVD)" and insert -- (DVDs) --, therefor.

In Column 8, Line 5, delete "560" and insert -- 570 --, therefor.

In the Claims:

In Column 11, Line 27, delete "an" and insert -- a --, therefor.

In Column 15, Line 5, in Claim 26, delete "channel;" and insert -- channel; and --, therefor.

Signed and Sealed this
Sixteenth Day of July, 2013

Teresa Stanek Rea
*Acting Director of the United States Patent and Trademark Office*